(12) United States Patent
Jin et al.

(10) Patent No.: US 7,619,872 B2
(45) Date of Patent: Nov. 17, 2009

(54) EMBEDDED ELECTROLYTIC CAPACITOR

(75) Inventors: Xing Jin, Shanghai (CN); Lei Hua, Shanghai (CN); Yaling Zhao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 11/444,749

(22) Filed: May 31, 2006

(65) Prior Publication Data

US 2007/0279840 A1 Dec. 6, 2007

(51) Int. Cl.
*H01G 4/228* (2006.01)

(52) U.S. Cl. ............... 361/306.2; 361/306.1; 361/306.3; 361/301.4; 361/523; 361/528

(58) Field of Classification Search ............... 361/306.2, 361/306.1, 306.3, 502–504, 508–512, 301.4, 361/523–528
See application file for complete search history.

(56) References Cited

U.S. PATENT DOCUMENTS

| 6,567,261 | B2 * | 5/2003 | Kanouda et al. ............ 361/502 |
| 6,815,747 | B2 | 11/2004 | Kosugi et al. |
| 6,829,133 | B2 | 12/2004 | Wermer et al. |
| 6,897,544 | B2 | 5/2005 | Ooi et al. |
| 6,900,991 | B2 | 5/2005 | Patel et al. |
| 6,903,917 | B2 | 6/2005 | Higashi et al. |
| 6,908,809 | B1 | 6/2005 | Provo et al. |
| 6,928,726 | B2 | 8/2005 | Zollo et al. |
| 6,967,138 | B2 | 11/2005 | Ding |
| 6,969,648 | B2 | 11/2005 | Cheng et al. |
| 6,969,912 | B2 | 11/2005 | Jow et al. |
| 6,970,362 | B1 * | 11/2005 | Chakravorty ............ 361/782 |
| 7,013,561 | B2 | 3/2006 | Nakatani et al. |
| 7,025,607 | B1 | 4/2006 | Das et al. |
| 7,301,751 | B2 * | 11/2007 | Lee et al. .................... 361/311 |
| 7,327,554 | B2 * | 2/2008 | Otsuka et al. ............ 361/306.3 |

FOREIGN PATENT DOCUMENTS

JP 02006336050 A * 12/2006

* cited by examiner

*Primary Examiner*—Nguyen T Ha
(74) *Attorney, Agent, or Firm*—Schwabe, Williamson & Wyatt, P.C.

(57) ABSTRACT

Apparatuses, methods, and systems associated with and/or having capacitors are disclosed herein. In various embodiments, a capacitor may be formed within a substrate having an interwoven-fiber material. In various ones of these embodiments, a capacitor may have a first electrode including an activation material disposed on a surface of an interwoven-fiber material, a second electrode including an electrolytic solution, and an insulating material disposed between the first electrode and the second electrode.

15 Claims, 4 Drawing Sheets

EMBEDDED ELECTROLYTIC CAPACITOR

TECHNICAL FIELD

Embodiments of the invention relate generally to the field of printed circuit board and/or flexible substrate manufacturing, specifically to methods, apparatuses, and systems associated with and/or using capacitors.

BACKGROUND

In the field of integrated circuit technology, a number of passive devices may be physically and electrically coupled to a substrate such as a printed circuit board (PCB). Such passive devices may include capacitors which may serve a number of purposes including, for example, providing a source of transient power, filtering, signal decoupling, generating oscillation, and fine-tuning. In most instances, these capacitors may be coupled to a PCB surface, by a surface-mount method or by pin connection.

Although surface mounting of capacitors may work well for some applications, the trend toward increasing capacitance demands as well as the ubiquitous shrinking of packages and boards may render current capacitance solutions problematic. With respect to increasing capacitance capability, such an increase can be accomplished by only a few methods including, for instance, increasing the face size of capacitor plates and/or decreasing the space between the capacitor plates. Clearly, increasing the face size of the capacitor plates may run counter to the decreasing size of packages and boards. In addition, current technology may have reached its limit with regard to decreasing the space between capacitor plates.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

Figure 1:
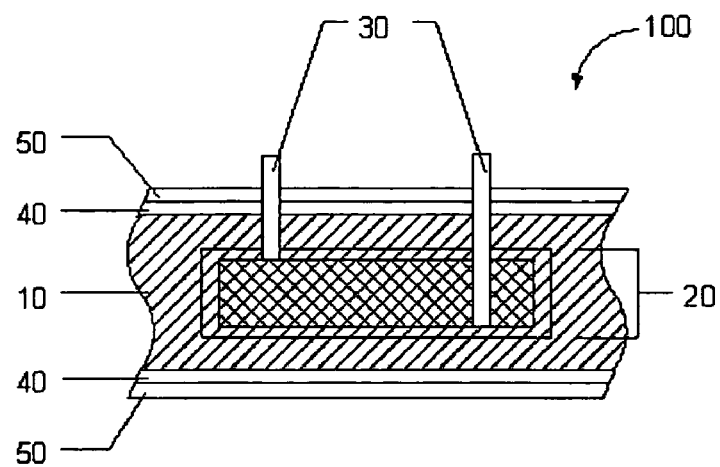
FIG. 1 illustrates a cross-section of a substrate incorporated with the teachings of the present invention, in accordance with various embodiments.

Referring now to FIG. 1, illustrated is a cross-section of an embodiment of a substrate 100 in accordance with various embodiments of the present invention. For the embodiments, substrate 100 may comprise a core 10 formed from an interwoven-fiber material, and within substrate 100 may be disposed one or more embedded capacitors 20. An embedded capacitor 20 may be variously located within substrate 100, depending on the applications. For instance, an embedded capacitor 20 may be located proximal to associating devices, and in various embodiments may be coupled to one or more associating devices by one or more electrode leads 30. In various embodiments, such proximal placement may have any one or more benefits including reducing interference, improving quality of signals, reducing the need for fine-tuning devices, and/or reducing time delay of power supply.

In various embodiments, substrate 100 may be any one of various types of structures for supporting and/or electrically coupling electronic components and/or devices. For example, in various embodiments, substrate 100 may be a PCB. In various other embodiments, substrate 100 may be a flexible substrate. Depending on the applications, substrate 100 may have one or more metal layers 40 and/or one or more solder mask layers 50 disposed thereon.

The interwoven-fiber material of core 10 of substrate 100 may be one or more of various types of carbon fiber, inorganic fiber, inorganic material based fiber, and inorganic material containing fiber. In various embodiments, an interwoven-fiber material may be a commercially-available filamental fiber material. In various other embodiments, an interwoven-fiber material may be glass, metal, ceramics (such as asbestos) and carbonic (such as graphite). Still further, in various embodiments, an interwoven-fiber material may include materials such as plastic or polymer incorporated with interwoven-fiber material.

In various embodiments, an embedded capacitor 20 may comprise a first electrode, a second electrode, and an insulating material disposed therebetween. In various ones of these embodiments, first electrode may include an activation material disposed on a surface of the interwoven-fiber material of core 10 of substrate 100. Due to the interwoven nature of the core 10, activation material may be disposed on a portion of a surface of the carbon fibers and/or may be disposed around entire surfaces of interwoven fibers of core 10. Compared to forming a first electrode on a non-interwoven material or forming a first electrode wherein the actual surface area is about equal to its nominal area, the interwoven nature of core 10 provides a much greater surface area with respect to its nominal area, thereby increasing the face size of a first electrode. Furthermore, in various ones of these embodiments and as discussed below, the activation material disposed on core 10 may be made porous which may result in a surface area thousands of times larger than the nominal surface area of the core 10 alone. In various embodiments, an increased face size of a first electrode may result in increased capacitance effects.

Figure 2:
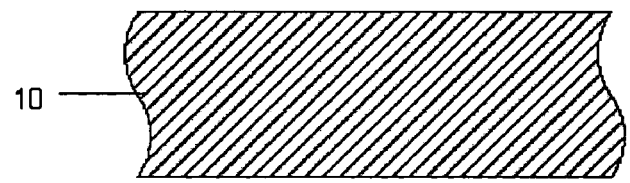
FIGS. 2-9 illustrate a method of making an embedded capacitor incorporated with the teachings of the present invention, in accordance with various embodiments.
Figure 3:
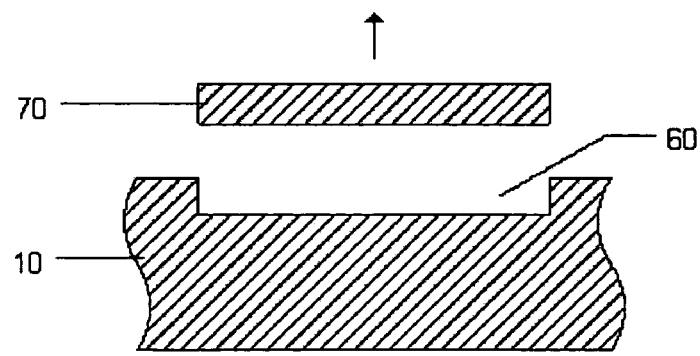
Figure 4:
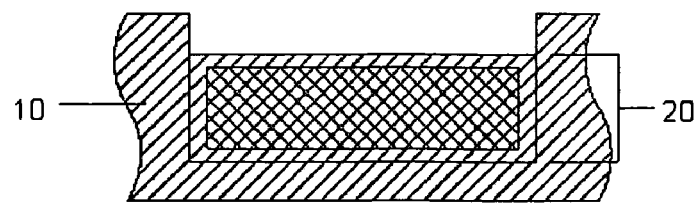
Figure 6:
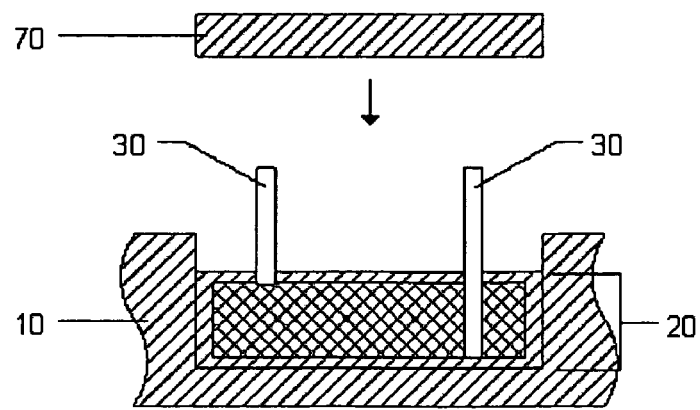

Referring to FIG. 2, FIG. 3, and FIG. 4, in various embodiments an area of core 10 within which an embedded capacitor is to be formed may be predefined and a recess 60 may be formed in the interwoven-fiber material of core 10 accordingly. In various ones of these embodiments, a removed portion 70 may be saved for filling in the recess 60 after a capacitor is formed (e.g., as shown in FIG. 6). Once the recess 60 is made, a capacitor may be formed in the exposed area of the interwoven-fiber material.

A first electrode of an embedded capacitor may include an activation material disposed on a surface of the interwoven-fiber material of core 10. Materials suitable for using as an activation material may be any conducting or pseudo-conducting material. For example, in various embodiments, an activation material may be metal-based and/or carbon-based. Metal-based activation materials may include any one or more of aluminum, tantalum, niobium, various other metals, or various metal alloys. In various embodiments, activation materials may include any one or more of various metal oxides, including, for example, ruthenium dioxide. Carbon-based activation materials may include any one or more of graphite, amorphous carbon, or carbon nanotubes.

Activation materials may be deposited or formed on core 10 of substrate 100 by various methods. In various embodiments, metal-based activation materials may be deposited/formed on core 10 by a chemical method and/or a physical method. For example, in some embodiments, a metal-based activation material may be formed by electrochemical plating, electroless plating, vacuum splashing, or physical vapor deposition. With respect to carbon-based activation materials, these materials may be deposited/formed by any one or more of various methods including, for example, sintering, pressing, and/or carbonizing from an organic intermediate (e.g., tar, polyacrylonitrile, etc.).

In various embodiments, an activation material on core 10 of substrate 100 may be porous. As discussed previously, the interwoven nature of core 10 provides a much greater surface area with respect to its nominal area, thereby increasing the face size of a first electrode. By making the activation material on core 10 porous (or, in various embodiments, increasing the porosity of activation material), the surface area may be further increased. For example, in various embodiments, the surface area of the activation material on core 10 (and, thus, of the first electrode) may be thousands of times larger than the nominal area of the core 10 alone. In various embodiments, the activation material may be made porous (or the porosity of already-porous activation material may be increased) by any one or more of a variety of methods. For example, methods of making an activation material porous may include any one or more of corrosion, high-energy ball grinding, decomposition and evaporation, dehydration, microwaving, and/or biochemical processing.

A second electrode may be formed within substrate 100 from an electrolytic solution. In various embodiments, an electrolytic solution may be any generally-known electrolytic solution and may be applied by various methods including, for example, pouring and soaking (e.g., by staging and/or ultrasonic stirring). In some embodiments, the electrolytic solution may be a colloid or some other type of dispersoid system. Furthermore, the electrolytic solution may be water-based or non-water-based, and in various embodiments, may be gelated.

In various embodiments, a resin-based material may be applied to areas of core 10 that will not be occupied by an embedded capacitor 20 prior to forming second electrode. For example, in various ones of these embodiments, an epoxy-based material may be used. A resin-based material may be applied for various purposes including, for example, sealing of core 10 so that the embedded capacitor is formed within a discrete area (i.e., applying a resin-based material to areas of core 10 except those areas in which an embedded capacitor will be formed). In some embodiments, the resin-based material may provide structural rigidity or mechanical support to the substrate 100.

Insulating material may be formed on a surface of the first electrode and between the first electrode and the second electrode to complete a capacitor structure. In various embodiments, the insulating material may be formed by anodizing. For example, in various embodiments, anodization may be effectuated by heating, electrically-biasing, and/or by soaking.

Figure 5:
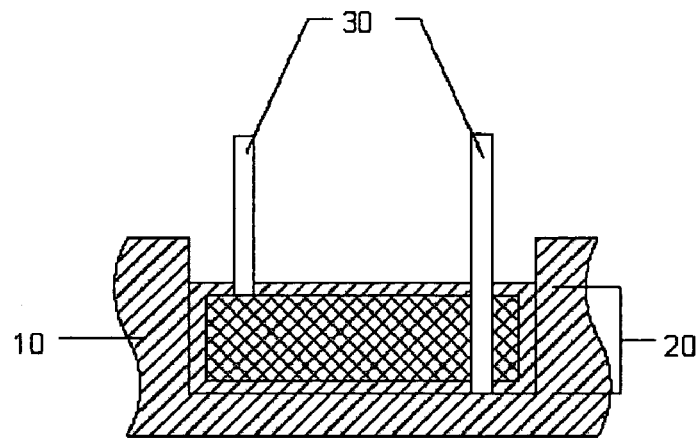

Referring now to FIG. 5, one or more electrode leads 30 may be electrically coupled to an embedded capacitor 20. In various ones of these embodiments, electrode leads 30 may be configured to extend into or out of substrate 100 and may be configured so that one or more devices external to a substrate 100 may be electrically coupled to the embedded capacitor 20 via electrode leads 30.

Figure 7:
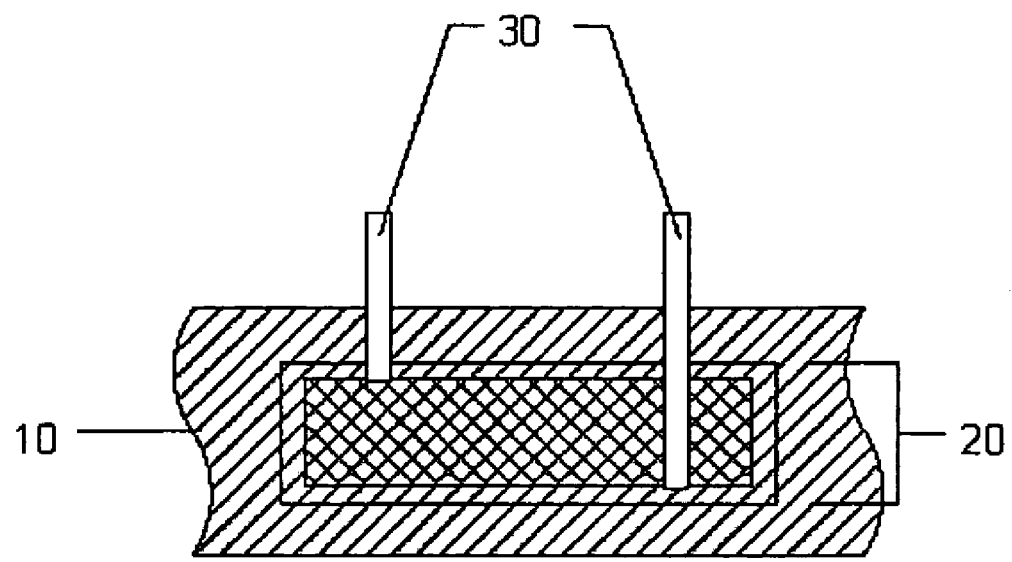
Figure 8:
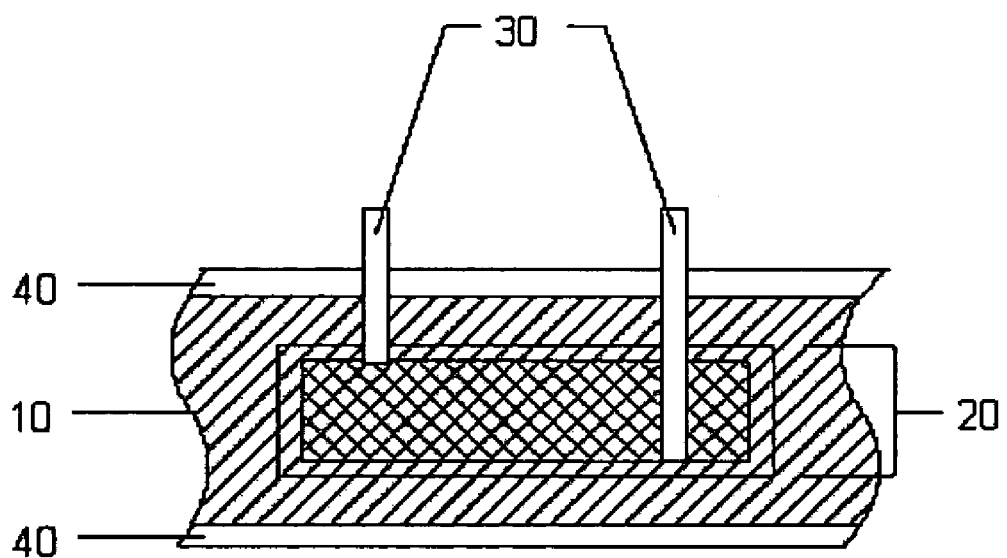
Figure 9:
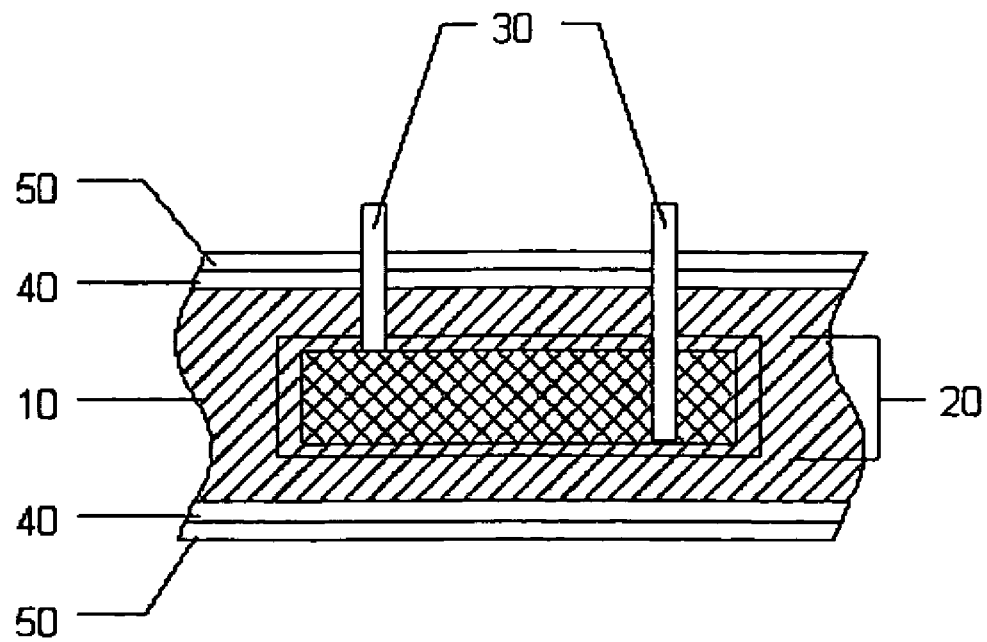

As alluded to earlier and shown in FIG. 6 and FIG. 7, portion 70 removed from core 10 to define recess 60 may be placed back into recess 60 to "seal" the embedded capacitor 20, and in various embodiments, a resin-based material may be applied over the replaced portion 70. In various ones of these embodiments, "sealing" may be in preparation for carrying out additional processes for fabricating substrate 100. For example and as shown in FIG. 8 and FIG. 9, additional fabrication processes to form a completed substrate 100 may comprise any one or more of forming one or more metal layers 40, etching as needed, depositing one or more solder mask layers 50, and/or surface bumping and mounting of devices.

Figure 10:
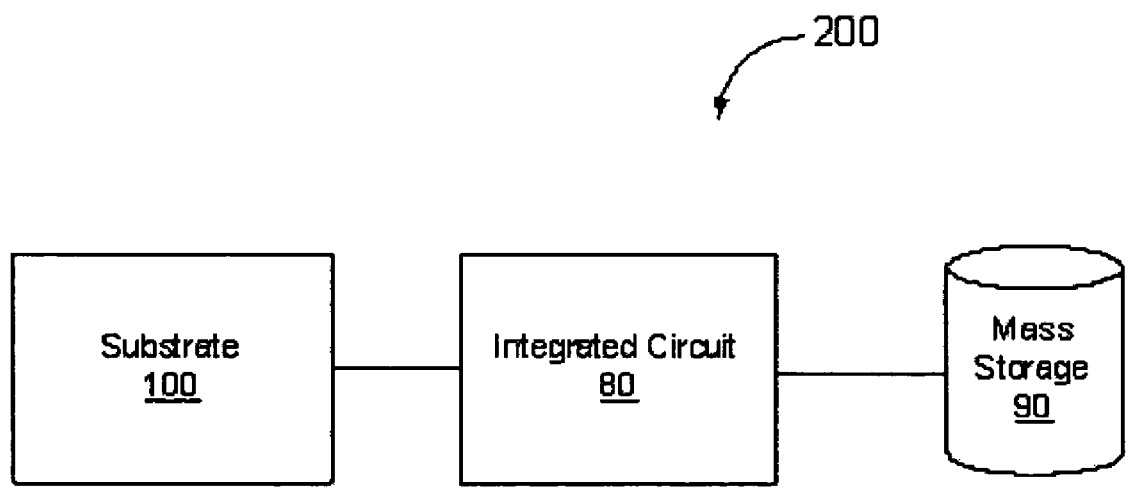
FIG. 10 illustrates a system incorporated with the teachings of the present invention, in accordance with various embodiments.

Referring now to FIG. 10, illustrated is a system 200 in accordance with various embodiments of the present invention. In various embodiments and as shown, system 200 may comprise a substrate 100 formed from an interwoven-fiber material and having at least one embedded capacitor. Substrate 100 may be electrically coupled to an integrated circuit 80, and integrated circuit 80 may be coupled to one or more mass storage devices 90. In various embodiments, integrated circuit 80 may be electrically coupled to an embedded capacitor by one or more electrode leads.

In various embodiments, mass storage device 90, integrated circuit 80, and substrate 100 having one or more embedded capacitors (except for the teachings of embodiments of the invention incorporated therein) represent a broad range of elements known in the art. For example, mass storage device 90 may be an optical storage, a magnetic storage, such as a disk drive, and so forth. Further, system 200 may be embodied in a broad range of form factors for a broad range of general or special purpose applications including, for example, a wireless adaptor, a wireless mobile phone, a set-top box, a personal digital assistant, a tablet computing device, a desktop computing device, and/or an entertainment control unit. System 200 may be endowed with various operating systems and/or applications to solve various computing problems.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus, comprising:
   a substrate formed from an interwoven-fiber material; and
   a capacitor embedded entirely within the substrate and having:
      a first electrode including an activation material;
      a second electrode formed from an electrolytic solution; and
      an insulating material disposed between the first electrode and the second electrode.

2. The apparatus of claim 1, wherein the activation material is selected from the group consisting of a metal-based material and a carbon-based material.

3. The apparatus of claim 2, wherein the metal-based material is selected from the group consisting of aluminum, tantalum, niobium, and a metal oxide.

4. The apparatus of claim 2, wherein the carbon-based material is selected from the group consisting of graphite, amorphous carbon, and carbon nanotubes.

5. The apparatus of claim 1, wherein the activation material is porous.

6. The apparatus of claim 1, wherein the electrolytic solution is a colloid.

7. The apparatus of claim 6, wherein the colloid is selected from the group consisting of a water-based colloid, a non-water-based colloid, and a gelated colloid.

8. The apparatus of claim 1, wherein the insulating material is disposed on the first electrode.

9. The apparatus of claim 1, further comprising an electrode lead connected to the capacitor and extending externally from the substrate.

10. The apparatus of claim 9, wherein the electrode lead includes a first distal end disposed within the substrate, and a second distal end disposed external to the substrate.

11. A system, comprising:
    a substrate formed from an interwoven-fiber material and having at least one capacitor embedded entirely within the substrate;
    an integrated circuit electrically coupled to the capacitor; and
    one or more mass storage devices coupled to the integrated circuit.

12. The system of claim 11, wherein the embedded capacitor comprises:
    a first electrode formed on a surface of the interwoven-fiber material;
    a second electrode formed using an electrolytic solution; and
    an insulating material disposed on the first electrode and between the first electrode and the second electrode.

13. The system of claim 11, wherein the system is a selected one of a wireless adaptor, a wireless mobile phone, a set-top box, a personal digital assistant, a tablet computing device, a laptop computing device, a desktop computing device, and an entertainment control unit.

14. The system of claim 11, further comprising an electrode lead including a first distal end disposed within the substrate and connected to the capacitor, and a second distal end disposed external to the substrate.

15. The system of claim 14, wherein the integrated circuit is electrically coupled to the embedded capacitor by the electrode lead.

\* \* \* \* \*

UNITED STATES PATENT AND TRADEMARK OFFICE
CERTIFICATE OF CORRECTION

PATENT NO. : 7,619,872 B2  
APPLICATION NO. : 11/444749  
DATED : November 17, 2009  
INVENTOR(S) : Jin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Twenty-sixth Day of October, 2010

David J. Kappos  
*Director of the United States Patent and Trademark Office*